United States Patent
Beckner

[11] Patent Number: 5,952,954
[45] Date of Patent: Sep. 14, 1999

[54] GROUND PENETRATING RADAR WITH SYNTHESIZED END-FIRE ARRAY

[75] Inventor: Frederick L. Beckner, Palo Alto, Calif.

[73] Assignee: Power Spectra, Inc., Sunnyvale, Calif.

[21] Appl. No.: 09/064,845

[22] Filed: Apr. 23, 1998

[51] Int. Cl.[6] .............................. G01S 13/88; G01V 3/38
[52] U.S. Cl. ............................................. 342/22; 342/159
[58] Field of Search ................................ 342/22, 27, 159,
342/162, 179, 180, 189, 190, 191, 192,
193, 194, 195, 196, 197, 203

[56] References Cited

U.S. PATENT DOCUMENTS

| | | | |
|---|---|---|---|
| 4,075,635 | 2/1978 | Unz | 343/844 |
| 4,121,209 | 10/1978 | ap Rhys | 342/161 |
| 4,351,035 | 9/1982 | Buchanan et al. | 367/14 |
| 4,641,317 | 2/1987 | Fullerton | 375/200 |
| 4,688,430 | 8/1987 | Anderson | 73/625 |
| 4,706,499 | 11/1987 | Anderson | 73/625 |
| 4,738,377 | 4/1988 | DeMoss, Jr. | 222/1 |
| 4,743,906 | 5/1988 | Fullerton | 342/27 |
| 4,809,010 | 2/1989 | Losee | 343/719 |
| 4,813,057 | 3/1989 | Fullerton | 375/259 |
| 4,817,434 | 4/1989 | Anderson | 73/625 |
| 4,872,144 | 10/1989 | Young et al. | 367/20 |
| 4,979,186 | 12/1990 | Fullerton | 375/239 |
| 5,005,418 | 4/1991 | Anderson | 73/625 |
| 5,020,374 | 6/1991 | Petroff et al. | 73/861.25 |
| 5,027,658 | 7/1991 | Anderson | 73/625 |
| 5,090,245 | 2/1992 | Anderson | 73/625 |
| 5,113,192 | 5/1992 | Thomas | 342/22 |
| 5,134,884 | 8/1992 | Anderson | 73/625 |
| 5,210,495 | 5/1993 | Hapashy et al. | 324/338 |
| 5,226,328 | 7/1993 | Petroff et al. | 73/861.25 |
| 5,229,977 | 7/1993 | Owen | 367/145 |
| 5,235,857 | 8/1993 | Anderson | 73/625 |
| 5,325,095 | 6/1994 | Vadnais et al. | 342/22 |
| 5,327,139 | 7/1994 | Johnson | 342/22 |
| 5,333,508 | 8/1994 | Petroff et al. | 73/861.25 |
| 5,363,108 | 11/1994 | Fullerton | 342/27 |
| 5,384,715 | 1/1995 | Lytton | 702/12 |
| 5,434,507 | 7/1995 | Beren et al. | 324/338 |
| 5,499,029 | 3/1996 | Bashforth et al. | 342/22 |
| 5,502,444 | 3/1996 | Kohlberg | 342/22 |
| 5,553,407 | 9/1996 | Stump | 37/348 |
| 5,644,314 | 7/1997 | Ahmad et al. | 342/22 |
| 5,673,050 | 9/1997 | Moussally et al. | 342/22 |

FOREIGN PATENT DOCUMENTS

WO 96/20417    7/1996    WIPO .

*Primary Examiner*—John B. Sotomayor
*Attorney, Agent, or Firm*—Burns Doane Swecker & Mathis, L.L.P.

[57] ABSTRACT

In a ground penetrating radar system, A-scan images of subsurface targets lying along the antenna boresight axis can be substantially improved and generated in real-time by employing a synthetic aperture, end-fire array, despite the inhomogeneous nature of the subsurface volume. The synthetic aperture, end-fire array is achieved by generating electro-magnetic (EM) ultra-wideband impulses at a number of precise locations along the antenna boresight access, shifting the returned EM signals in the time domain according to the corresponding antenna boresight location, and then integrating the shifted, returned EM signals. In addition, an incremental, reverse-coherent integration technique is provided. This incremental technique allows for a more rapid generation of the A-scan image. The reverse-coherent integration technique eliminates unintended, stationary targets from the A-scan image, which are caused by coherent noise/clutter sources.

14 Claims, 5 Drawing Sheets

GROUND PENETRATING RADAR WITH SYNTHESIZED END-FIRE ARRAY

CROSS-REFERENCE TO CO-PENDING APPLICATIONS

This application is related to application Ser. No. 08/861,817, filed May 23, 1997 now allowed.

BACKGROUND

The present invention relates to time of flight (TOF) measurement systems. More particularly, the present invention relates to a ground penetrating radar (GPR) system that is capable of providing A-scan images of subsurface targets using a synthetic aperture, end-fire array.

In the past, GPR has been used for a number of diverse applications, for example, geophysical applications such as mapping subsurface strata; locating toxic waste sites for remediation; and detection and location of unexploded subsurface ordnance.

GPR systems are similar to ordinary radar systems in that both measure target range (i.e., the distance from the radar system to an intended target, or portion thereof) by determining the amount of time it takes for electromagnetic (EM) radiation to travel from the radar to the intended target and then back to the radar. In practice, however, conventional GPR systems are inherently more complicated than ordinary radar systems due to some unique problems associated with transmitting and receiving EM radiation through a subsurface medium.

The first problem is that the subsurface medium (e.g., the earth) is typically inhomogeneous. Therefore, the EM radiation in a GPR system must travel through a number of different media, for example, air, rock, sand, water, clay, and other types of subsurface mineral deposits, each with a different and unquantified dielectric constant. Hence, the propagation velocity of the EM radiation from point to point within the subsurface volume may vary dramatically and is typically unknown without first performing a detailed, time-consuming analysis of the subsurface volume.

Ordinary radars do not encounter this problem because they transmit and receive EM radiation through "free space" (i.e., air) which is a homogeneous medium with a known dielectric constant. Because the dielectric constant of air is known, the propagation velocity of the EM radiation traveling through the air is known. Therefore, the computation of target range is quickly reduced to the task of multiplying the EM radiation time-of-flight (i.e., the round trip travel time between the radar and the target) by the propagation velocity of EM radiation through air.

The second problem associated with conventional GPR is that EM radiation does not penetrate the earth as easily as it penetrates the air. In fact, some media, such as wet clay or salt water, are so absorbent that EM radiation, at the frequency ranges relevant to GPR, cannot penetrate more than a few inches. The ability to penetrate a subsurface medium is highly dependent upon the frequency of the EM radiation. More specifically, low frequencies tend to achieve greater subsurface penetration. Unfortunately, lower frequencies also result in decreased target range resolution (i.e., target range accuracy). However, range resolution is also dependent upon bandwidth. For some time, GPR systems have been employing ultra-wideband techniques, especially ultra-wideband impulse techniques which, to a significant extent, improve a GPR's ability to penetrate a subsurface medium without sacrificing resolution.

Although the two above-identified problems are by no means the only problems that affect GPR performance, they are clearly two very significant problems. Consequently, there is a need to produce a GPR system that, despite the above-identified problems, can produce a subsurface image in real- or near real-time. Moreover, there is a need to provide such a system that is physically compact so that it can be utilized in a spatially limited area.

In order to produce subsurface target images that are relatively free of noise/clutter, it is necessary to suppress radar echoes associated with both coherent and non-coherent noise/clutter. Non-coherent noise/clutter can be suppressed by employing any number of coherent integration techniques that are well-known in the art. The suppression of coherent noise/clutter is generally more problematic because coherent integration techniques do not attenuate coherent signals whether those signals are associated with one or more sources of noise/clutter or an intended subsurface target. Coherent noise/clutter is especially problematic when the corresponding echoes exhibit the same or similar time delays as the echoes associated with the intended target, because the echoes associated with the coherent noise/clutter are likely to result in "stationary targets" that appear in the image and interfere with or occlude the signal(s) associated with an intended target.

Coherent noise/clutter can emanate from any number of internal and/or external sources. Examples of such internal sources include the radar antenna, the radar receiver, and the attenuators. An example of an external source that might generate coherent noise/clutter is an object that remains at 90° off boresight throughout the course of the radar dwell. It is important to note that the radar echoes associated with these various internal and external, coherent noise/clutter sources tend to be strong (i.e., powerful) signals relative to the radar echoes associated with intended subsurface targets, because the only transmission medium between the radar antenna and these noise/clutter sources is air, which does not attenuate radar energy nearly as much as subsurface media.

Accordingly, it would also be desirable to provide a GPR system that is capable of generating an A-scan image of a subsurface target, using a synthetic aperture, end-fire array technique, that has been thoroughly purged of any "stationary targets" that were caused by coherent noise/clutter sources. It is further desirable to minimize the amount of processing time required to produce that image, despite any additional processing tasks that are required to suppress the coherent noise/clutter.

SUMMARY

The present invention involves an ultra-wideband impulse ground penetrating radar (GPR) system that employs a synthetic aperture, end-fire array. The synthetic aperture, end-fire array technique characteristically produces a very narrow beam without the need to determine the propagation velocities throughout the subsurface volume. Additionally, the present invention employs an incremental, reverse-coherent integration technique. Accordingly, the GPR is capable of more rapidly generating an image of the subsurface volume, although the image evolves over the course of each radar dwell. While an intended subsurface target, if one exists, may not initially appear in the image, it will develop during the course of the dwell. In contrast, "stationary targets" may at first appear in the image, but they are eventually attenuated out of the image.

It is, therefore, an object of the present invention to provide a GPR system that is capable of detecting subsurface objects such as mineral ore bodies and other subsurface structures.

It is yet another object of the present invention to provide a GPR system that is capable of detecting, locating and identifying subsurface ore bodies from an area that is spatially constrained, for example, an underground mine shaft.

It is another object of the present invention to provide a GPR system that more effectively suppresses stationary targets in the GPR image caused by coherent noise/clutter.

It is still another object of the present invention to provide a GPR system that can generate a real or near real-time image of the subsurface volume.

In accordance with one aspect of the present invention, the aforementioned and other objects are achieved by a method and/or an apparatus for removing clutter from a radar signal. The method and/or apparatus involves generating an average radar signal as a function of a current radar signal and a prior average radar signal, wherein the current radar signal is associated with a present antenna position along an antenna boresight axis and the prior average radar signal is based on radar signals associated with each of a plurality of prior antenna positions along the antenna boresight axis. After generating the average radar signal, an updated radar signal is generated by removing clutter from the current radar signal, wherein the clutter is removed by reducing the amplitudes associated with the current radar signal by an amount equal to a corresponding amplitude associated with the average radar signal. The updated radar signal is then shifted in the time domain by an amount of time that is a function of the present antenna position. Finally, a processed radar signal is generated by integrating the updated radar signal with a previously processed radar signal, if any, wherein the previously processed radar signal is associated with the previous antenna position along the boresight axis.

In accordance with another aspect of the present invention, the aforementioned and other objects are achieved by a method and/or an apparatus for generating a radar image of a subsurface target. The method and/or apparatus involves transmitting and receiving a current radar signal from a current antenna position n, wherein the antenna position n is one of a plurality of antenna positions 0 ... N along a boresight axis. A current average radar signal is generated as a function of the current radar signal and a previous average radar signal associated with a prior antenna position n−1, if any, along the boresight axis. The current radar signal is then updated by integrating the current radar signal with the current average radar signal. Next, a radar signal propagation delay is determined, wherein the radar signal propagation delay is associated with the current antenna position. The updated radar signal is then shifted in the time domain as a function of the radar signal propagation delay. A processed radar signal associated with the current antenna position n is then generated by integrating the time shifted, updated radar signal and a previous processed radar signal, if any, associated with the prior antenna position n−1 along the boresight axis. Finally, the processed radar signal is displayed.

BRIEF DESCRIPTION OF THE DRAWINGS

The objects and advantages of the invention will be understood by reading the following detailed description in conjunction with the drawings in which.

DETAILED DESCRIPTION

The present invention is an ultra-wideband (UWB), ground penetrating radar (GPR) system that overcomes the above-identified problem of propagating electromagnetic (EM) radiation through an inhomogeneous medium. The present invention overcomes this problem by employing a synthetic aperture, end-fire array, which is implemented by translating the radar antenna in free space and along the antenna boresight where the dielectric constant and, hence, the propagation velocity of EM radiation is well known. In addition, the present invention employs a progressive, reverse-coherent integration technique to suppress undesirable "stationary targets" from the radar image caused by coherent noise/clutter sources.

Although only preferred embodiments are specifically illustrated and described herein, one skilled in the art will appreciate that many modifications and variations of the present invention are possible and within the purview of the appended claims without departing from the spirit and intended scope of the invention. For example, the embodiments described below primarily involve an UWB, impulse generating GPR. However, one skilled in the art will recognize that other types of GPR could form the basis of alternative embodiments of the present invention. Other types of GPR include linear FM GPR (i.e., swept frequency GPR) and stepped frequency GPR.

Figure 1:
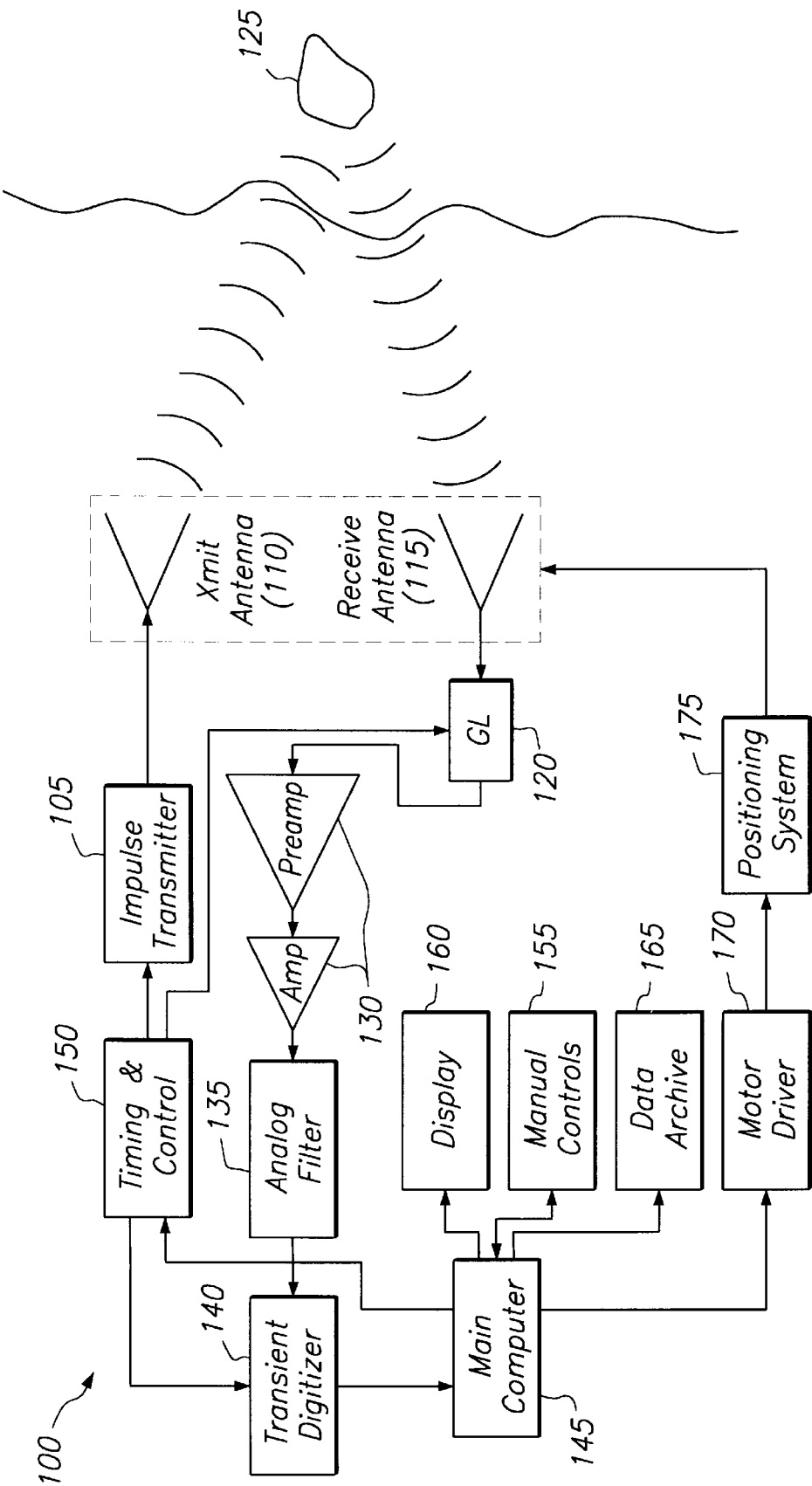
FIG. 1 is a block diagram of the present invention.

FIG.1 shows a block diagram of an exemplary embodiment of the present invention 100. According to FIG. 1, the EM radiation is generated by an impulse transmitter 105. The impulse transmitter 105 emits UWB impulses that approximate differentiated monocycles, wherein each impulse comprises two short positive-going pulses with an intermediary negative excursion. In addition, each UWB impulse reflects a bandwidth of greater than 100 percent, which enhances target range resolution, as is well known in the art.

The exemplary embodiment illustrated in FIG. 1 also includes separate, but co-located, transmit and receive antennas 110 and 115 respectively. This antenna configuration is commonly referred to as a "bistatic" configuration. Those skilled in the art, however, will recognize that similar functionality can be achieved with a single antenna (i.e., a monostatic configuration). Connected to the receive antenna 115 is a high speed gate limiter (GL) switch 120. In a preferred embodiment, the GL switch is a high speed, gallium arsenide-based switch. This high speed switch prevents the receiver from saturating or clipping due to large, cross-fed (i.e., "leakage") signals that propagate from the transmitter antenna 110 directly into the receive antenna 115 without first penetrating or reflecting from the ground. The large, initial pulse caused by the cross-fed signals is undesirable and it is important that it be suppressed.

After the EM radiation energy reflecting back from the intended target 125 has been received, it is processed by a number of electronic devices including one or more amplifiers 130, an analog filter 135, and a transient digitizer 140. The amplifiers 130 increase the amplitude of the EM radiation energy return signal. In a preferred embodiment, the amplifier gain levels increase over time to compensate for the attenuation of the EM radiation energy return signal which increases as the range to the intended target 125 increases. The analog filter 135 removes DC offsets from the EM radiation energy signal before the signal is digitized. This, of course, is necessary in order to accurately integrate the EM radiation energy return signal with other EM radiation energy return signals. Once filtered, the EM radiation energy signal is digitized by a transient digitizer 140, so that the signal can be processed by the signal processing algorithms resident in the main computer 145.

The main computer 145 issues control signals for a timing and control circuit 150, which in turn controls the timing of the impulse transmitter 105 and the GL switch 120. The main computer 145 also issues control signals for the motor driver 170 and the positioning system 175 which translate the antennas 110 and 115 along the boresight axis, as will be described in greater detail below. The main computer 145 also accepts manual control inputs, as illustrated by block 155, and outputs images and/or status information to a display unit 160. Finally, the main computer 145 is capable of archiving data (e.g., storing image and/or status information in memory), as illustrated by block 165.

As stated, the present invention employs a synthetic aperture, end-fire array, which produces an effectively narrow antenna beamwidth. As those skilled in the art will recognize, a narrower antenna beamwidth typically results in greater signal-to-clutter ratios. The synthetic aperture, end-fire array technique also facilitates the process of coherently integrating the digitized signals which represent the EM radiation energy received from intended targets, and it facilitates decorrelating the digitized signals which represent the EM radiation energy received from unintended objects and/or clutter. By improving the coherent integration of target data and the decorrelation of unintended objects and/or clutter, the present invention is able to provide a clear measure of subsurface target location. Finally, the synthetic aperture, end-fire array facilitates the collection of EM radiation in a confined space by eliminating any need to utilize a multiple antenna array.

Figure 2:
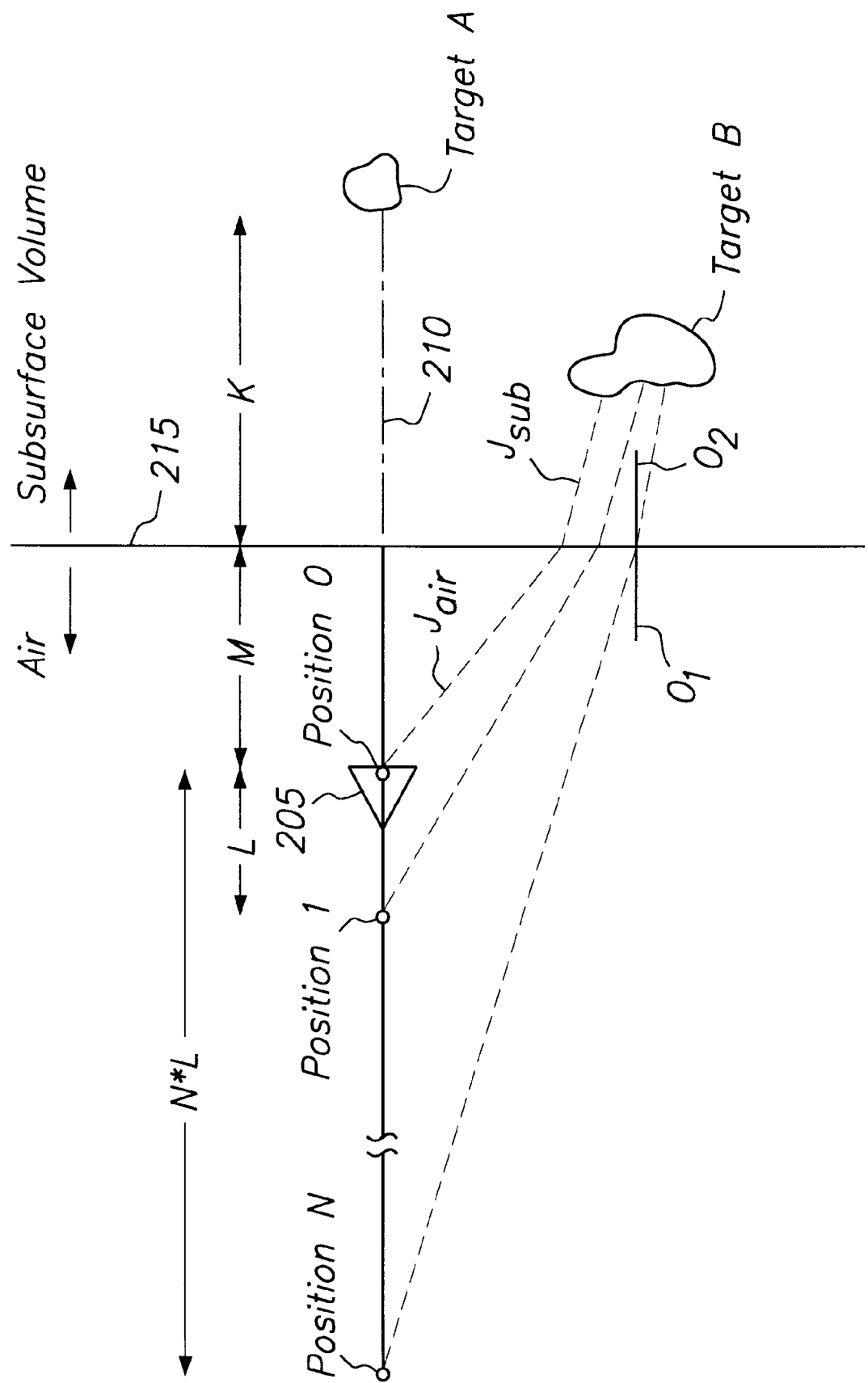
FIG. 2 is a diagram illustrating the synthetic aperture, end-fire array technique.

FIG. 2 illustrates the synthetic aperture, end-fire array technique. In accordance with an exemplary embodiment of the present invention, the radar sensor 205 (i.e., the radar antenna) is first located at a position 0 where it emits multiple ultra-wideband (UWB) impulses along the antenna boresight 210 in the direction of an intended target A. The EM radiation energy stored in the UWB impulses travels forward through free space (i.e., air), penetrates the air/subsurface volume interface 215, which is essentially perpendicular to the antenna boresight 210, propagates through the subsurface volume, intercepts both on-boresight targets (e.g., target A) and off-boresight objects (e.g., object B), and then reflects back towards the radar sensor 205. After the EM radiation energy associated with each UWB impulse is received, amplified, and digitized, the digital signals representing each of the received UWB impulses are integrated by signal processing algorithms residing in and executed by the main computer 145.

The radar sensor 205 is then translated along the antenna boresight 210 to a position 1 which is precisely located a distance L from position 0. At position 1, the radar sensor 205 once again emits multiple UWB impulses in the direction of the intended target A. As FIG. 2 illustrates, the EM radiation energy associated with the UWB impulses emitted at position 1 and traveling along the antenna boresight 210 must travel an additional distance of 2*L as compared with the EM radiation energy associated with the UWB impulses emitted at position 0. It is important to note that the on-boresight, subsurface distance K remains the same, with respect to position 0 and position 1. The on-boresight air path, M plus n*L, varies only by the distance L as the antenna is moved from position 0 to position 1, wherein n represents the antenna position and equals 0 . . . N. The off-boresight subsurface path $J_{sub}$ and the off-boresight air path $J_{air}$ also vary as the antenna is moved. The total off-boresight path length $J_{sub}$ plus $J_{air}$ changes by less than L as the antenna is moved from position 0 to position 1. The farther off-axis target B is, the less the off-boresight path length changes as the antenna is moved.

It is also important to note that the off-boresight EM radiation changes direction, in accordance with Snell's Law, when it penetrates the air/subsurface volume interface 215, as illustrated in FIG. 2. For example, if the angle of incidence $\theta_1$ is 30 degrees, the angle $\theta_2$ is determined by the following relationship:

$$\theta_2 = \arcsin(\sin 30°/\eta) \qquad (1)$$

wherein $\eta$ is the index of refraction. Depending upon the soil, $\eta$ will typically range from approximately 3 to approximately 20. As one skilled in the art will recognize, higher indices of refraction will result in smaller angular values for $\theta_2$, which further enhances the present invention's ability to decorrelate clutter and other signal returns due to off-boresight objects as will be explained in more detail below.

The digital signals representing the EM radiation energy received, while the radar sensor 205 is located at position 1, are then shifted in the time domain by the signal processing algorithms, and by an amount that is equivalent to the time required for EM radiation to propagate a distance of 2*L through free space (i.e., air). Once shifted, the digital signals representing the EM radiation energy received at position 1 and the digital signals representing the EM radiation energy received at position 0 will be aligned in the time domain (i.e., coherent) only with respect to EM radiation energy returns corresponding to targets lying along the antenna boresight 210. As will be explained below, the EM radiation energy returns that are associated with objects lying off-boresight will not be aligned as a result of the time-shift procedure. The digital signals representing the EM radiation energy received at position 1 are then integrated with the digital signals representing the EM radiation energy received at position 0. Accordingly, the digital signals representing the EM radiation energy associated with targets lying along the antenna boresight 210 will be coherently integrated (i.e., added) during the integration process while all other non-coherent returns will be decorrelated during the integration process.

More generally, the radar sensor 205 is translated to a number of positions 0 . . . N along the antenna boresight 210. At each position 0 . . . N, the digital signals representing the EM radiation energy returns are shifted in the time domain by an amount equivalent to the time required for EM propagating along the antenna boresight 210 to travel the additional round trip distance of 2*n*L, where n equals 0 . . . N. As stated above, the digital signals are then integrated by the signal processing algorithms in the main computer 145.

Figure 3A:
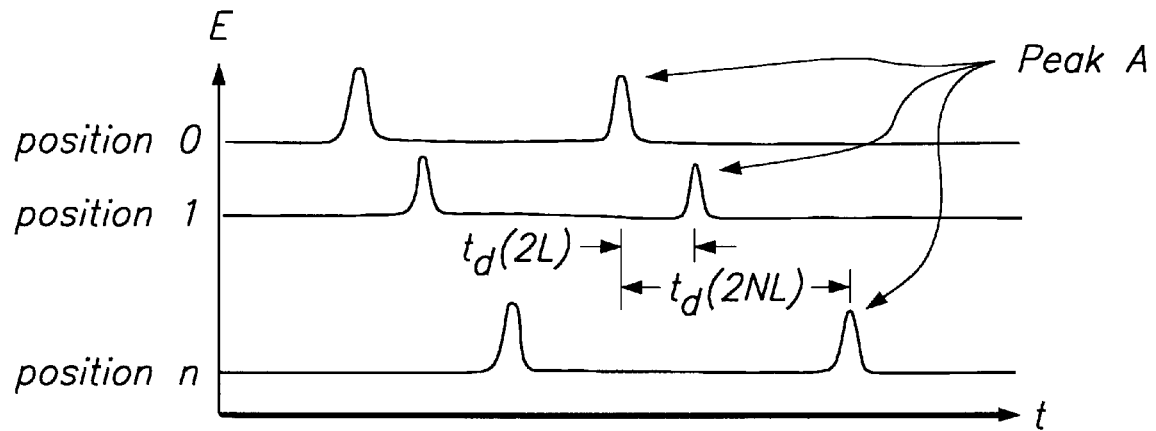
FIGS. 3A, 3B and 3C are timing diagrams which depict the shifting and integration of the radar returns.

FIG. 3A depicts three exemplary EM signal returns: a first corresponding to the EM signal received at position 0, a second corresponding to the EM signal received at position 1, and a third corresponding to the EM signal received at position N. For purposes of illustration, the signals in FIG. 3A are depicted as analog signals; however, one skilled in the art will readily understand that the signals would be digitized by the transient digitizer 140 prior to signal processing. In FIG. 3A, Peak A represents that portion of each EM signal associated with EM energy reflecting from target A, which lies along the antenna boresight 210. With respect to the EM signals corresponding to positions 1 and N, peak A is shifted in the time domain by an amount of time $t_d(2L)$ and $t_d(2NL)$ respectively, wherein the values of $t_d(2L)$ and $t_d(2NL)$ represent the amount of time that it will take the EM radiation propagating along the antenna boresight 210 to travel the additional distance of 2*L and 2*N*L respectively. As the additional distances traveled by the EM radiation occurs in free space, the additional time $t_d(2L)$ and $t_d(2NL)$ is computed by the signal processing algorithms in accordance with the following relationship:

$$t_d = (2*M*L)/c \qquad (2)$$

where L is the distance between successive positions 0 . . . N lying along the antenna boresight 210, c is the velocity of light in air, and M varies from 0 to N.

Figure 3B:
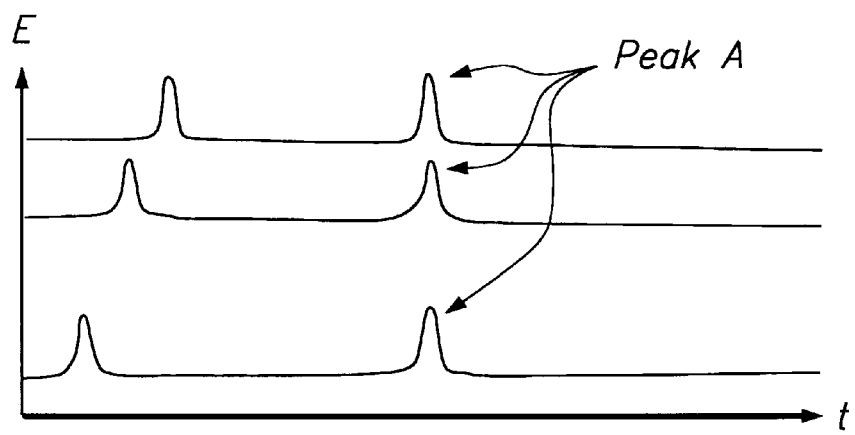

FIG. 3B illustrates the same three exemplary EM signals after being shifted based on the corresponding time delay $t_d(2L)$ and $t_d(2NL)$ respectively. Note, that by shifting the signals accordingly, peak A for each signal becomes aligned with respect to time. Conversely, those portions of the EM signals associated with reflections due to off-boresight objects (e.g., object B), do not align after the signals are shifted. That is because the distance traveled by the EM radiation propagating along a path other than the antenna boresight 210 (e.g., along a path that intercepts object B) will vary by an amount other than 2*N*L.

Figure 3C:
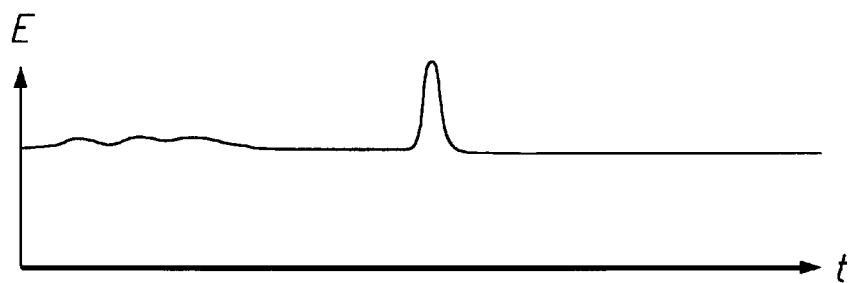

FIG. 3C illustrates the resultant signal after shifting the received EM signals and then integrating them with respect to position. More particularly, FIG. 3C, shows that the coherent EM energy returns, such as those corresponding to target A, will be added during the integration process. At the same time, the non-coherent returns, such as those corresponding to object B, will be decorrelated during the integration process by the signal processing algorithms.

As explained above, the air/subsurface volume interface 215 will cause the EM radiation line-of-sight to bend, in accordance with Snell's Law, upon penetrating the subsurface volume for all axes other than the antenna boresight 210. That is because the antenna boresight 210 is, as mentioned above, perpendicular to the air/subsurface volume interface 215 and because the dielectric constant for the subsurface volume is greater than the dielectric constant for air. This bending of the EM radiation line-of-sight, in turn, causes off-boresight objects (e.g., object B) to appear further from the antenna boresight 210 than they really are. The change in dielectric constant and the bending of the EM radiation effectively synthesizes a more narrow antenna bandwidth, which in turn enhances the decorrelation of EM radiation energy reflecting back from off-boresight objects.

In an alternative embodiment of the present invention, radar data is collected at each of the SAR end-fire array antenna positions 0 . . . N along the boresight axis, for example, boresight axis 210. After collecting the radar data at a given antenna position n, updated radar data is derived by shifting the radar data associated with the current antenna position n in the time domain, as described above, by a factor of 2*n*L, and then integrating it with the already processed radar data associated with the preceding antenna positions 0 . . . n−1. In addition, a reverse-coherent integration technique is employed to suppress coherent stationary clutter (relative to the radar antenna) and noise which might otherwise appear in the GPR image.

In general, the reverse-coherent integration technique is accomplished by averaging the unshifted radar data associated with the current antenna position n, as well as each preceding antenna position 0 . . . n−1. This gives an estimate of the stationary clutter, which is then subtracted from the current radar data. Signal processing routines in the main computer 145 then shift this subtracted radar data in the time domain by a factor of 2*n*L and add it to the previously processed radar data (i.e., the shifted and integrated radar data associated with the current antenna position n and the preceding antenna positions 0 . . . n−1). The resulting processed radar data is then displayed.

Radar data processing is executed incrementally, such that the process is repeated upon the collection of radar data at each antenna position 0 . . . N, unless the user terminates the operation early (i.e., before the end of the radar dwell). With each additional array of radar data samples, the average, unshifted radar data increasingly reflects coherent stationary clutter echoes. This is then subtracted from the current, measured radar data and effectively from all previous measured data. Accordingly, this alternative embodiment progressively attenuates echoes (i.e., from one antenna position to the next) from the CPR image caused by coherent stationary clutter. In contrast, echoes associated with intended subsurface targets progressively emerge, as they are non-coherent due to the repositioning of the antenna along the boresight axis.

There are a number of advantages associated with this alternative embodiment. First, less memory is required to process the radar data because storing all of the radar data associated with each antenna position 0 . . . N prior to executing the signal processing routines and displaying the radar data is unnecessary. Less memory translates into less hardware and, ultimately, a smaller, more lightweight device. This is significant given the intended application of the present invention which includes manual operation in a physically confined environment.

A second advantage is that the user does not have to wait for all of the radar data to be collected before obtaining a radar image. In fact, in accordance with a preferred embodiment, a radar image will be displayed immediately after collecting and processing radar data associated with the first antenna position. However, there will be no visible image until after collecting and processing the radar data associated with the second antenna position. The radar data being displayed is, of course, incrementally updated after radar data is collected and processed at each subsequent antenna position. If it becomes apparent to the user that the evolving display contains no echo associated with a desired subsurface target, the user can terminate the operation early, reposition the SAR end-fire array GPR, and initiate a new operation. This is especially advantageous in that it allows the user to scan a greater subsurface volume in a shorter period of time.

The reverse-coherent processing technique summarized above is embodied in equation (3) below:

$$ProcDat[N.i] = (1/N) \sum_{n=1}^{N} (RadarData[n, i + D(n)] - Avg[N, i + D(n)]) \qquad (3)$$

where RadarData[n,i] represents an array of radar data samples associated with a current antenna position n; N represents the total number of antenna positions along the boresight axis, such that $1 \leq n \leq N$; i represents the sample number; D(n) is the time delay (in units of the radar data sample interval) associated with the current antenna position n; and Avg[N,i] represents an array of current average radar data values. Avg[N,i] is more specifically defined by equation (4) below.

$$Avg[N, i] = (1/N) \sum_{n=1}^{N} \text{RadarData}[n, i] \quad (4)$$

It will be recognized that ProcDat[N,i], as defined by equation (3) above, depends upon the radar data (i.e., the array of radar data samples) associated with each antenna position 0 . . . N along the boresight axis. In order to derive ProcDat[N,i] using equation (3), it is necessary to first acquire and store the radar data from each antenna position 0 . . . N. However, as stated above, it is the objective of this alternative embodiment to derive and display ProcDat[N,i] incrementally. Accordingly, equation (3) is manipulated as follows, beginning with equation (5).

$$ProcDat[N-1, i] = \quad (5)$$
$$(1/(N-1)) \sum_{n=1}^{N-1} (\text{RadarData}[n, i+D(n)] - Avg[N-1, i+D(n)])$$

Equation (6) then follows as a function of equations (3), (4) and (5).

$$(N)ProcDat[N, i] = (N-1)ProcDat[N-1, i] + \quad (6)$$
$$\sum_{n=1}^{N} (\text{RadarData}[n, i+D(n)] - Avg[N, i+D(n)]) -$$
$$\sum_{n=1}^{N-1} (\text{RadarData}[n, i+D(n)] - Avg[N-1, i+D(n)])$$

Equation (6) can then be simplified as shown in equation (7) below.

$$(N)ProcDat[N, i] = (N-1)ProcDat[N-1, i] + \quad (7)$$
$$(\text{RadarData}[N, i+D(N)] - Avg[N, i+D(N)]) -$$
$$\sum_{n=1}^{N-1} (Avg[N, i+D(n)] - Avg[N-1, i+D(n)])$$

Equation (8) provides the relationship that is used to incrementally compute Avg[N,i] based on the array of radar data samples associated with the Nth antenna position (i.e., RadarData[N,i]) and the average radar data associated with the N−1 antenna position (i.e., Avg[N−1,i]). In contrast, Avg[N,i], in equation (3) was based on the radar data associated with each antenna position 0 . . . N.

$$Avg[N,i]=(1/N)((N-1)Avg[N-1,i]+\text{RadarData}[N,i]) \quad (8)$$

Equation (9) is then derived by substituting for Avg[N,i+D(n)] from equation (8).

$$(N)ProcDat[N, i] = (N-1)ProcDat[N-1, i] + \quad (9)$$
$$(\text{RadarData}[N, i+D(N)] - Avg[N, i+D(N)]) -$$
$$(1/N) \sum_{n=1}^{N-1} (\text{RadarData}[N, i+D(n)] - Avg[N-1, i+D(n)])$$

The significance of equation (9) is that it permits the array of processed radar data, ProcDat[N,i], to be derived, and subsequently displayed, incrementally (i.e., at each antenna position 0 . . . N along the boresight axis) as a function of the following: the processed radar data associated with the previous antenna position N−1 (i.e., the first term in equation (9), ProcDat[N−1,i]), the current radar data less the current average radar data (i.e., the second term in equation (9), RadarData[N,i+D(N)]−Avg[N,i+D(N)]), and a correction term (i.e., the last term in equation (9)). The correction term compensates for the difference between the average of N−1 samples used in the previous calculation and the average of N samples used in the current calculation.

While equation (3) embodies the reverse-coherent integration technique in general, equation (9) embodies an incremental, reverse-coherent integration technique. It will be further understood that equation (9) could be implemented in software, in accordance with standard programming techniques, and executed from the main computer 145.

Figure 5:
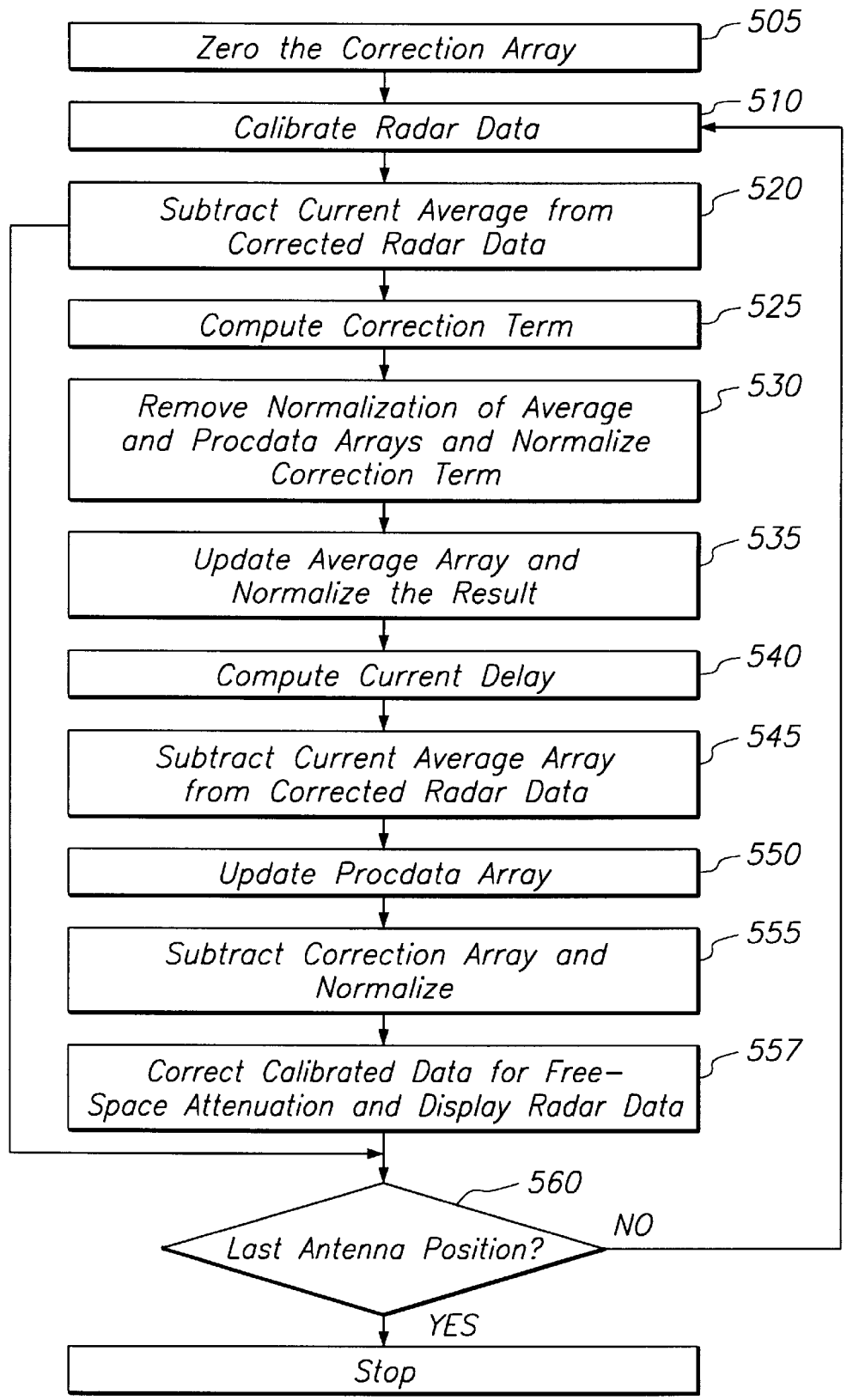
FIG. 5 is a flowchart illustrating the reverse-coherent integration technique.

FIG. 5 illustrates a more detailed technique for implementing the incremental, reverse-coherent integration technique embodied in equation (9) above. As explained, the reverse-coherent integration technique is employed incrementally. As such, it involves the progressive accumulation of radar data samples at each of the antenna positions 0 . . . N along the boresight axis. Accordingly, it is necessary to begin by zeroing the correction array (i.e., the memory used for accumulating the radar data over the course of the radar dwell). Zeroing the correction array is accomplished in step 505.

After zeroing the correction array, the raw (i.e., uncorrected) radar data is calibrated, as shown in step 510. In actuality, this is an optional step. The raw radar data samples can be calibrated by converting the integer transient digitizer data, at the input of the transient digitizer 140, into a floating-point voltage in accordance with equation (10) below:

$$\text{CalRadarData}[i]=((\text{RawRadarData}[i]*S)/65534)-DC_{OFFSET} \quad (10)$$

where S represents the sensitivity of the transient digitizer 140 (e.g., in volts peak-to-peak) and $DC_{OFFSET}$ represents the average transient digitizer output when the input is grounded. The value 65534 represents the number of least significant bit intervals in a 16-bit digitizer input voltage peak-to-peak range.

In the next step 520, the average radar data associated with the N−1 antenna position is subtracted from the current calibrated radar data, RadarData[N,i], as defined in equation (11). The resulting array of radar values (i.e., TempDataA [N,i]) is stored so that the array of values can be used later to compute the correction term (i.e., the third or final term in equation (9)).

$$\text{TempDataA}[N,i]=\text{RadarData}[N,i]-Avg[N-1,i] \quad (11)$$

Once Avg[N−1,i] has been subtracted from RadarData[N, i], the third term in equation (9) (i.e., the correction term, Correction[N,i]) can be computed as shown in step 525 and in accordance with equation (12).

$$\text{Correction}[N, i] = \sum_{n=1}^{N-1} (\text{TempDataA}[N, i+D(n)]) \quad (12)$$

It should be noted that the correction term, Correction[N,i], is not yet normalized (i.e., divided by a factor of N), as shown in equation (9).

In step 530, Avg[N,i] and the array of processed radar data samples, ProcDat[N−1,i], associated with the N−1 antenna position are denormalized. Denormalization is accomplished by multiplying both arrays by a factor of N−1. It is necessary to denormalize these arrays prior to updating them. In addition, the correction term (i.e., Correction[N,i]) is normalized by dividing the array by a factor of N.

During the next step 535, Avg[N,i] is updated by adding the current, calibrated radar data (i.e., the array of radar data samples associated with the current antenna position N, RadarData[N,i]) and the average radar data associated with the N−1 antenna position, Avg[N−1], and then dividing the resulting array by a factor of N. Step 535 is embodied in equation (13) below.

$$\text{Avg}[N,i]=((N-1)\text{Avg}[N-1,i]+\text{RadarData}[N,i])/N \quad (13)$$

It should be noted that equation (13) is equivalent to equation (8) above.

The propagation delay associated with the current antenna position N is then derived in step 540 and in accordance with equation (14) below:

$$D(N)=(2*\text{Zpos}[N])/(c\text{TimePerSamp}) \quad (14)$$

where Zpos[N] represents the current antenna position N (e.g., in inches); c is the velocity of light in air (e.g., in inches per second); and TimePerSamp represents the time period required by the transient digitizer 140 to generate a digitized radar data sample. An approximate value for TimePerSamp would typically be 200 picoseconds.

The second term in equation (9) can now be derived in accordance with step 545. More specifically, the updated array of average radar data, Avg[N,i], derived in equation (13), is subtracted from the current, range-corrected radar data, RadarData[N,i], as shown in equation (15).

$$\text{TempDataB}[N,i]=\text{RadarData}[N,i]-\text{Avg}[n,i] \quad (15)$$

The resulting array, TempDataB[N,i], can be stored and used later to update the SAR end-fire beamforming calculation.

The next step 550 involves updating the processed radar data, ProcDat[N−1,i], which is the first term in equation (9), with a range-delayed and interpolated version of TempDataB[N,i]. The updated version of the array, ProcDat [N−1,i], is defined in equation (16) as ProcDatUpdate[N,i].

$$\text{ProcDatUpdate}[N,i]=(N-1)\text{RadarData}[N-1,i]+\text{TempDataB}[N,i+D(N)] \quad (16)$$

ProcDatUpdate[N,i] actually represents both the first and the second terms in equation (9) above.

In step 555, the correction array, i.e., the third term in equation (9), derived above in equation (12), is subtracted from ProcDatUpdate[N,i], and the resulting array is normalized by dividing by a factor of N. Step 555 is given by equation (17).

$$\text{ProcData}[N,i]=(\text{ProcDatUpdate}[N,i]-\text{Correction}[N,i])/N \quad (17)$$

The calibrated radar data (i.e., CalRadarData[i]) is then corrected for attenuation due to propagation through free space, as illustrated in step 557. Correction of the calibrated radar data may be accomplished by applying equation (18) below:

$$\text{RngCorrData}[N,i]=\text{CalRadarData}[N,i]*((R_0+R_{pc}+i(C/2)\text{TimePerSamp})/R_0)^2 \quad (18)$$

where $R_0$ is a near-field effect correction factor and $R_{pc}$ represents the beginning location of the range window relative to the phase center of the antenna. The range correction given by equation (18) is based on the assumption that the range (i.e., the distance of the intended subsurface target from the antenna) is in the far field, where the near-field/far-field boundary is given by 2× the size of the antenna divided by wavelength, as is well known in the art. It should be noted that the expression RngCorrData[N,i] in equation (18) corresponds to the term RadarData[N,i] in equation (9).

The video processing routines in the main computer 145 then display the data contained in the array ProcData[N,i]. As discussed above, ProcData[N,i] is re-derived after collecting and processing the radar data samples at each antenna position 0 . . . N. Therefore, the technique embodied in the flowchart of FIG. 5 is continuously repeated until radar data has been collected, processed and displayed with respect to the last antenna position N, in accordance with decision block 560, or until the user terminates the radar operation.

It should be noted, in a GPR system that employs a true bistatic antenna configuration, where the transmit and receive antennas are physically separated by a significant distance, the above-identified, reverse-coherent integration technique is not likely to effectively remove coherent noise/clutter from the GPR images. However, in a preferred embodiment of the present invention, a bistatic approximation of a monostatic antenna configuration is employed, where the transmit and receive antennas are located immediately adjacent to each other. Accordingly, the reverse-coherent integration technique described above can be employed accurately in both the monostatic antenna configuration and the bistatic approximation of a monostatic configuration.

It should be further noted that the reverse-coherent integration technique described above could be used in a GPR system that employs a true bistatic configuration. However, to do so, the reverse-coherent integration technique would have to take into consideration the fact that the angle of propagation through the subsurface medium, and hence the propagation delay through the subsurface medium, will change as the antenna translates from one antenna position to the next along the boresight axis. Of course, additional processing routines would be needed to account for these changes. As the present invention employs a bistatic approximation of a monostatic configuration, as stated above, any additional accuracy that might be achieved by employing these additional processing routines would likely be insignificant, and not worth the additional processing time required to achieve the additional accuracy.

Figure 4A:
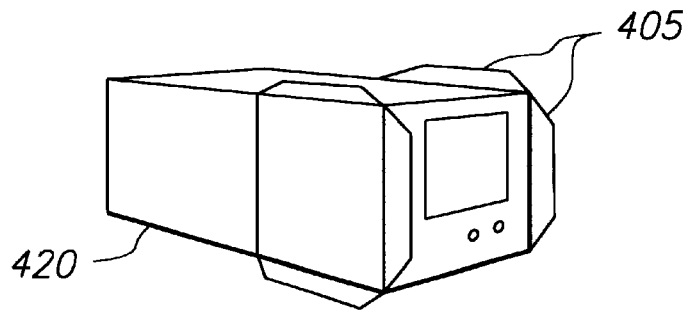
FIGS. 4A, 4B and 4C illustrate the exterior configuration of the present invention.
Figure 4B:
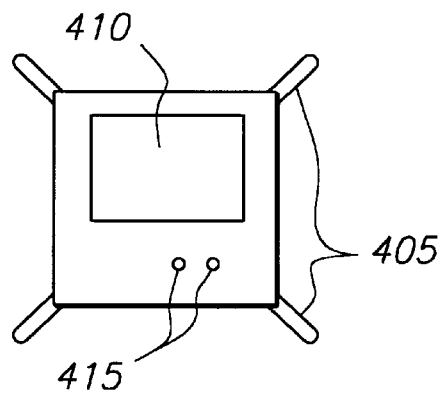

FIGS. 4A and 4B illustrate a perspective view and a front view of the exterior configuration of the present invention, in accordance with an exemplary embodiment. Together, these figures show that the exterior design includes a number of handles 405 which are used for manually lifting and positioning the radar, which is small enough and light enough that it can be lifted and placed in position by one person. The figures also show that the exterior design includes a built-in computer monitor 410 along with a number of standard controls 415 for adjusting the monitor display. On the distal end, the exterior design comprises a radome 420 which surrounds and protects the radar antenna. The near end houses all of the supporting electronic circuitry, such as the amplifiers 130, the analog filter 135, the transient digitizer 140, and the main computer 145.

Figure 4C:
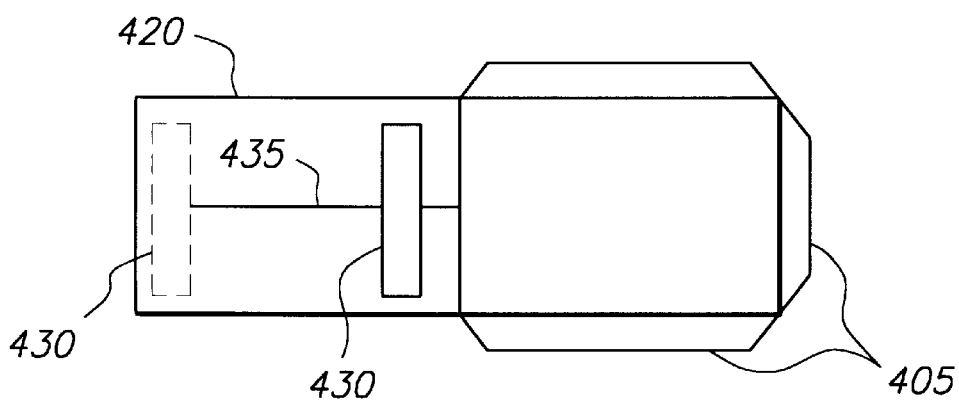

FIG. 4C shows a side view of the present invention, with the interior of the radome 420 exposed. As stated above, to implement the synthetic aperture, end-fire array technique, the radar antenna is translated along the antenna boresight. FIG. 4C shows that this is actually accomplished by translating the radar antenna 430 along a guide rail 435, wherein the guide rail 435 is coincident with the antenna boresight 210. A servo motor unit (not shown), housed in the near-end compartment, is used to move the radar antenna 430 along the guide rail 435.

The present invention provides a number of advantages over prior conventional GPR systems. First, the synthetic aperture, end-fire array technique employed by the present invention makes it unnecessary to precompute the propagation characteristics for each region within the subsurface volume. This, in turn, results in relatively simple signal processing routines. Therefore, on-boresight, A-scan images of subsurface targets are achieved in real-time with a relatively limited amount of computation. Second, the present invention provides for effectively narrow beamwidths, which are otherwise difficult to achieve with UWB impulses. Third, the antenna beam-forming requirements are minimal, further facilitating a compact design to support the inventions use in a spatially constrained environment.

What is claimed is:

1. A method for removing clutter from a radar signal comprising the steps of:
   generating an average radar signal as a function of a current radar signal and a prior average radar signal, wherein the current radar signal is associated with a present antenna position along an antenna boresight axis and the prior average radar signal is based on radar signals associated with each of a plurality of prior antenna positions along the antenna boresight axis;
   generating an updated radar signal by removing clutter from the current radar signal, wherein the clutter is removed by reducing the amplitudes associated with the current radar signal by an amount equal to a corresponding amplitude associated with the average radar signal;
   shifting the updated radar signal in the time domain by an amount of time that is a function of the present antenna position; and
   generating a processed radar signal by integrating the updated radar signal with a previously processed radar signal, if any, wherein the previously processed radar signal is associated with the previous antenna position along the boresight axis.

2. The method of claim 1 further comprising the steps of:
   generating a correction signal by reducing the amplitudes associated with the current radar signal by an amount equal to a corresponding amplitude associated with the prior average radar signal;
   shifting the correction signal in the time domain as a function of the current antenna position;
   updating the correction signal by integrating the shifted correction signal with a prior correction signal associated with the prior antenna position; and
   adjusting the processed radar signal by summing each amplitude associated with the processed radar signal and a corresponding amplitude associated with the updated correction signal.

3. A method for generating a radar image of a subsurface target comprising the steps of:
   transmitting and receiving a current radar signal from a current antenna position n, wherein the antenna position n is one of a plurality of antenna positions 0 . . . N along a boresight axis;
   generating a current average radar signal as a function of the current radar signal and a previous average radar signal associated with a prior antenna position n−1, if any, along the boresight axis;
   updating the current radar signal by integrating the current radar signal with the current average radar signal;
   determining a radar signal propagation delay associated with the current antenna position;
   shifting, in the time domain, the updated radar signal, as a function of the radar signal propagation delay;
   generating a processed radar signal associated with the current antenna position n by integrating the time shifted, updated radar signal and a previous processed radar signal, if any, associated with the prior antenna position n−1 along the boresight axis; and
   refreshing a display of the processed radar signal.

4. The method of claim 3 further comprising the steps of:
   determining whether a radar signal has been transmitted and received from the last antenna position N along the boresight axis; and
   if a radar signal has not been transmitted and received from the last antenna position along the boresight axis, repeating said method for a next antenna position n+1.

5. The method of claim 3 further comprising the steps of:
   calibrating the radar signal associated with the current antenna position n; and
   correcting the calibrated radar signal for attenuation due to propagation through free space.

6. The method of claim 5, wherein said step of calibrating the radar signal comprises the step of:
   converting the radar signal into a floating-point voltage, wherein said conversion step is a function of a digitizer sensitivity factor, a number of bits associated with the digitizer and a DC voltage offset.

7. The method of claim 3 further comprising the steps of:
   generating a correction signal by subtracting the amplitudes associated with the previous average radar signal from a corresponding amplitude associated with the current radar signal;
   shifting the correction signal in the time domain as a function of the current antenna position n;
   generating an updated correction signal by integrating the shifted correction signal with a previous correction signal, wherein the previous correction signal is associated with the prior antenna position n−1; and
   adjusting the processed radar signal by summing each amplitude associated with the processed radar signal with a corresponding amplitude associated with the updated correction signal.

8. An apparatus for removing coherent stationary clutter from a ground penetrating radar signal comprising:
   means for generating an average radar signal as a function of a current radar signal and a prior average radar signal, wherein the current radar signal is associated with a present antenna position along an antenna boresight axis and the prior average radar signal is based on the radar signals associated with each of a plurality of prior antenna positions along the antenna boresight axis;
   means for generating an updated radar signal by removing coherent stationary clutter from the current radar signal, wherein the coherent stationary clutter is removed by reducing the amplitudes associated with the current radar signal by an amount equal to a corresponding amplitude associated with the average radar signal;

means for shifting the updated radar signal in the time domain by an amount of time that is a function of the present antenna position; and means for generating a processed radar signal by integrating the updated radar signal with a previously processed radar signal, if any, wherein the previously processed radar signal is associated with the previous antenna position along the boresight axis.

9. The apparatus of claim 8 further comprising:

means for generating a correction signal by reducing the amplitudes associated with the current radar signal by an amount equal to a corresponding amplitude associated with the prior average radar signal;

means for shifting the correction signal in the time domain as a function of the current antenna position;

means for updating the correction signal by integrating the shifted correction signal with a prior correction signal associated with the prior antenna position; and means for adjusting the processed radar signal by summing each amplitude associated with the processed radar signal and a corresponding amplitude associated with the updated correction signal.

10. In a ground penetrating radar system, an apparatus for generating a radar image of a subsurface target comprising the steps of:

antenna for transmitting and receiving a current radar signal from a current antenna position n, wherein the antenna position n is one of a plurality of antenna positions 0 . . . N along a boresight axis;

means for generating a current average radar signal as a function of the current radar signal and a previous average radar signal associated with a prior antenna position n−1, if any, along the boresight axis;

means for updating the current radar signal by integrating the current radar signal with the current average radar signal;

means for determining a radar signal propagation delay associated with the current antenna position;

means for shifting, in the time domain, the updated radar signal, as a function of the radar signal propagation delay;

means for generating a processed radar signal associated with the current antenna position n by integrating the time shifted, updated radar signal and a previous processed radar signal, if any, associated with the prior antenna position n−1 along the boresight axis; and means for refreshing a display of the processed radar signal.

11. The apparatus of claim 10 further comprising:

means for determining whether a radar signal has been transmitted and received from the last antenna position N along the boresight axis; and if a radar signal has not been transmitted and received from the last antenna position along the boresight axis, means for repeating said method for a next antenna position n+1.

12. The apparatus of claim 10 further comprising:

means for calibrating the radar signal associated with the current antenna position n; and means for correcting the calibrated radar signal for attenuation due to propagation through free space.

13. The apparatus of claim 12, wherein said means for calibrating the radar signal comprises:

means for converting the radar signal into a floating-point voltage, wherein said conversion means is a function of a digitizer sensitivity factor, a number of bits associated with the digitizer and a DC voltage offset.

14. The apparatus of claim 10 further comprising:

means for generating a correction signal by subtracting the amplitudes associated with the previous average radar signal from a corresponding amplitude associated with the current radar signal;

means for shifting the correction signal in the time domain as a function of the current antenna position n;

means for generating an updated correction signal by integrating the shifted correction signal with a previous correction signal, wherein the previous correction signal is associated with the prior antenna position n−1; and means for adjusting the processed radar signal by summing each amplitude associated with the processed radar signal with a corresponding amplitude associated with the updated correction signal.

* * * * *